United States Patent [19]

Farfaglia

[11] 4,035,926
[45] July 19, 1977

[54] HEATING THE END OF A TUBULAR MEMBER

[75] Inventor: Silvio T. Farfaglia, Fulton, N.Y.

[73] Assignee: Phillips Petroleum Company, Bartlesville, Okla.

[21] Appl. No.: 689,605

[22] Filed: May 24, 1976

[51] Int. Cl.² .......................... F26B 3/00; F26B 25/00
[52] U.S. Cl. .......................................... 34/34; 34/104; 34/105; 432/230
[58] Field of Search ................. 432/230; 34/104, 105, 34/34; 93/44.1 R

[56] References Cited

U.S. PATENT DOCUMENTS

| 2,967,387 | 1/1961 | Barnes | 53/373 |
| 3,193,369 | 7/1965 | Benard et al. | 432/230 |
| 3,724,093 | 4/1973 | Oilila | 34/104 |
| 3,817,816 | 6/1974 | Watt | 156/583 |
| 3,824,702 | 7/1974 | Farfaglia | 432/230 |
| 3,825,408 | 7/1974 | Farfaglia | 432/230 |
| 3,847,540 | 12/1974 | Farfaglia et al. | 432/230 |

Primary Examiner—John J. Camby

[57] ABSTRACT

The end of a tubular member to be heated is received in an annular space between a central core and a shroud. Hot gas passes through passageways in the central core against the inside surface of the tubular member, then along the inside surface to the end of the tubular member, and then along the outside surface of the tubular member. At least one of the flow of hot gas along the inside surface and the flow of hot gas along the outside surface of the tubular member is caused to follow a spiral path.

24 Claims, 3 Drawing Figures

HEATING THE END OF A TUBULAR MEMBER

The invention relates to method and apparatus for heating the end of a tubular member. In a specific aspect the invention relates to method and apparatus for heating the matching areas of a container bottom member and a tubular container sidewall so that the bottom member can be bonded to the sidewall.

In high speed machines for the fabrication of containers from thermoplastic coated paperboard, it is desirable that portions of a container sidewall and a container bottom be heated to bonding temperatures in a fraction of a second, but it is still desirable, if not essential, that uniform heating be accomplished so that liquid-tight or gas-tight bonds can be effected without overheating the components. Accordingly, it is an object of the present invention to provide a new and improved means for heating the end of a tubular member. Another object of the invention is to increase the uniformity of heating of the end of a tubular member. Other objects, aspects and advantages of the invention will be apparent from a study of the specification, the drawings and the appended claims to the invention.

In the drawings

Figure 1:
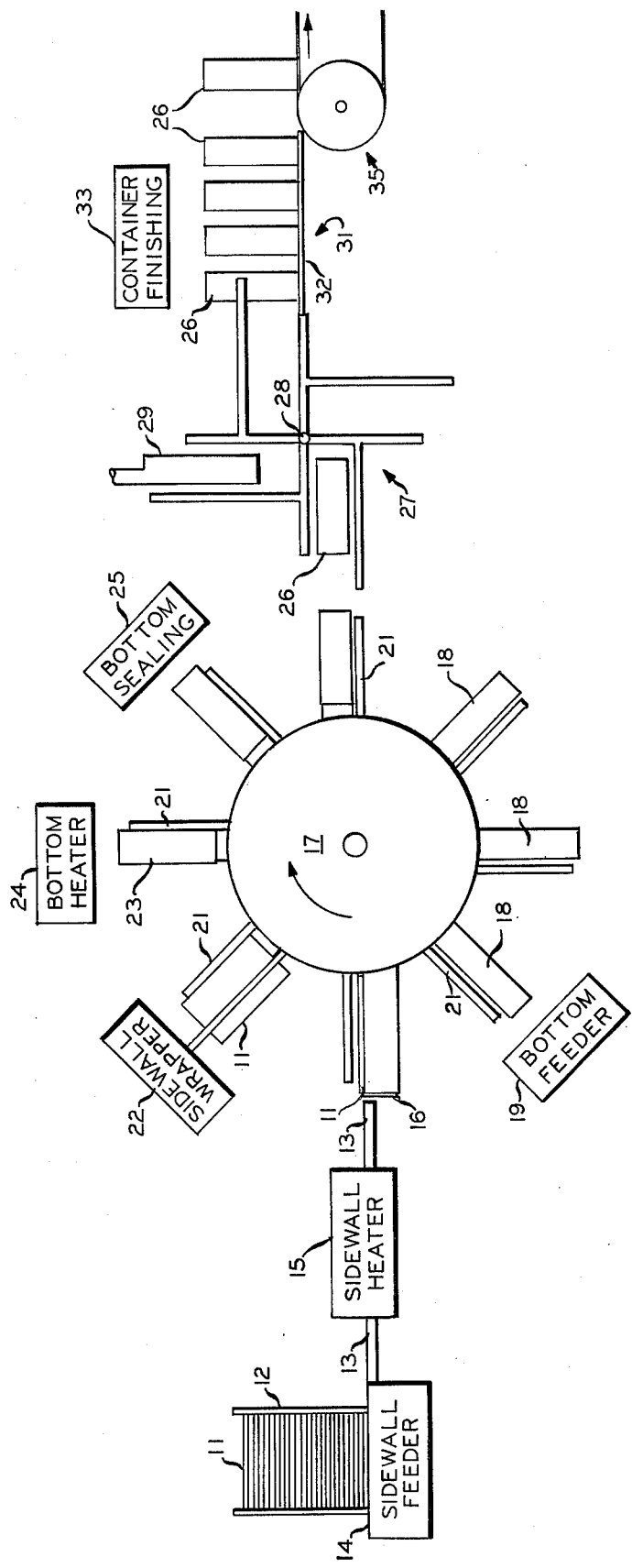
FIG. 1 is a diagrammatic representation of a container forming machine embodying the present invention.

Referring now to FIG. 1 in detail, thermoplastic coated paperboard sidewall blanks 11 are individually withdrawn from magazine 12 and transferred to conveyor 13 by sidewall feeder 14. The blank 11 is passed through sidewall heater 15 to heat to a suitable bonding temperature the thermoplastic coating in the side marginal positions which are to be overlapped in the formation of the sidewall into a container. Turret 17 is mounted for rotation about its horizontal axis and is provided with a plurality of mandrels 18 which extend radially outwardly from said horizontal axis in a vertical plane perpendicular to said horizontal axis. The mandrels 18 are spaced apart on the turret 17 in a uniform manner. A suitable bottom feeder mechanism 19 supplies individual bottom members 16 to the outermost end face of mandrels 18. Each mandrel 18 is provided with suitable means, for example a suction means, to hold the bottom member 16 in place on the end face of the mandrel. The turret rotates, stepwise, in a clockwise direction as viewed in FIG. 1, to move a bare mandrel to the bottom feeding station to receive a bottom member 16 and then to the horizontal position in alignment with conveyor means 13 to receive a heated blank 11. Each mandrel 18 has a sidewall clamp 21 associated therewith which is in the open position, spaced apart from its mandrel 18, at the sidewall blank receiving station to permit the heated blank 11 to be inserted between the mandrel 18 and clamp 21 by conveyor means 13. The clamp 21 is then actuated to secure the median or intermediate portion of the heated blank 11 in position on mandrel 18, after which the turret 17 is indexed to the next position to carry the secured blank 11 and bottom member 16 to the sidewall wrapping station. The sidewall wrapping means 22 wraps the blank 11 around mandrel 18 to form a convolute and to apply pressure to the overlapped heated side margins to bond the side margins, thereby forming a tubular sidewall 23.

At the next indexing of turret 17, the mandrel carrying the tubular sidewall 23 is moved from the sidewall wrapping station to the bottom heating station, where the margin of the sidewall adjacent the bottom member 16 is heated by bottom heating means 24 to a suitable bonding temperature. The turret 17 is then indexed to transport the mandrel 18 and the heated sidewall 23 to a bottom sealing station, where bottom sealing means 25 applies pressure to the heated portions of the sidewall 23 and bottom member 16 to form the bottom seal. In one embodiment the bottom member 16 has a shape at least substantially equal to the shape of the end face of mandrel 18, and the bottom margin of the tubular sidewall 23 is folded inwardly into contact with the bottom member 16 to form the bottom seam. A container of this type is illustrated by I. L. Wilcox in U.S. Pat. No. 3,369,726, issued Feb. 20, 1968. In another embodiment the bottom member 16 can be formed with a central disc portion having a diameter substantially equal to the diameter of the end face of mandrel 18 and an annular flange portion folded to extend outwardly from the mandrel 18 at least approximately parallel to the side surface of the mandrel 18. In the latter embodiment the flange portion of the bottom member 16 can be bonded to the contacting surface of the tubular sidewall 23. If desired, the tubular sidewall bottom margin can be longer than the flange of bottom disc member 16 to permit the bottom margin to be folded approximately 180° to form a U which contacts both sides of the flange of bottom member 16. If desired, the bottom seam can be rolled by suitable known means. Where the bottom member 16 is flanged, bottom feeder 19 can employ a suction cup transfer mechanism, or flat discs can be chip fed and then forced through a die to form the flange and then applied to the end face of mandrel 18.

After the bottom seal is formed, the turret 17 is indexed to transport the formed container 26 to a stripping station, and the associated clamp 21 is moved to the open position to release the container 26. Although any suitable mechanical stripping means can be employed, it is presently preferable to utilize pneumatic pressure applied through the mandrel to the inside of the container to eject the container from the mandrel 18 into a pocket of turret 27. Turret 27 is rotated stepwise about horizontal axis 28 to move the ejected container 26 from the initial horizontal position to a vertical position with the open end up. A pusher arm 29 is moved through the upright pocket of turret 27 to move the container 26 to the receiving station of a container finishing apparatus 31. If desired, two receiving stations can be positioned on opposite sides of turret 27 and pusher arm 29 can move alternate containers to opposite receiving stations.

The container finishing apparatus comprises a base assembly 32 equipped with conveyor means for moving the containers from station to station and means for grasping each container 26 as required to insure stability of the container during the finishing process. A finishing means 33 is located above one or more stations of the base assembly 32 for perforninng one or more finishing operations on the container 26 passing thereunder. The container finishing apparatus 31 delivers the finished containers to a suitable conveying means 35 for removing the finished containers 26 to a location for filling and sealing or for other disposition as appropriate.

Figure 2:
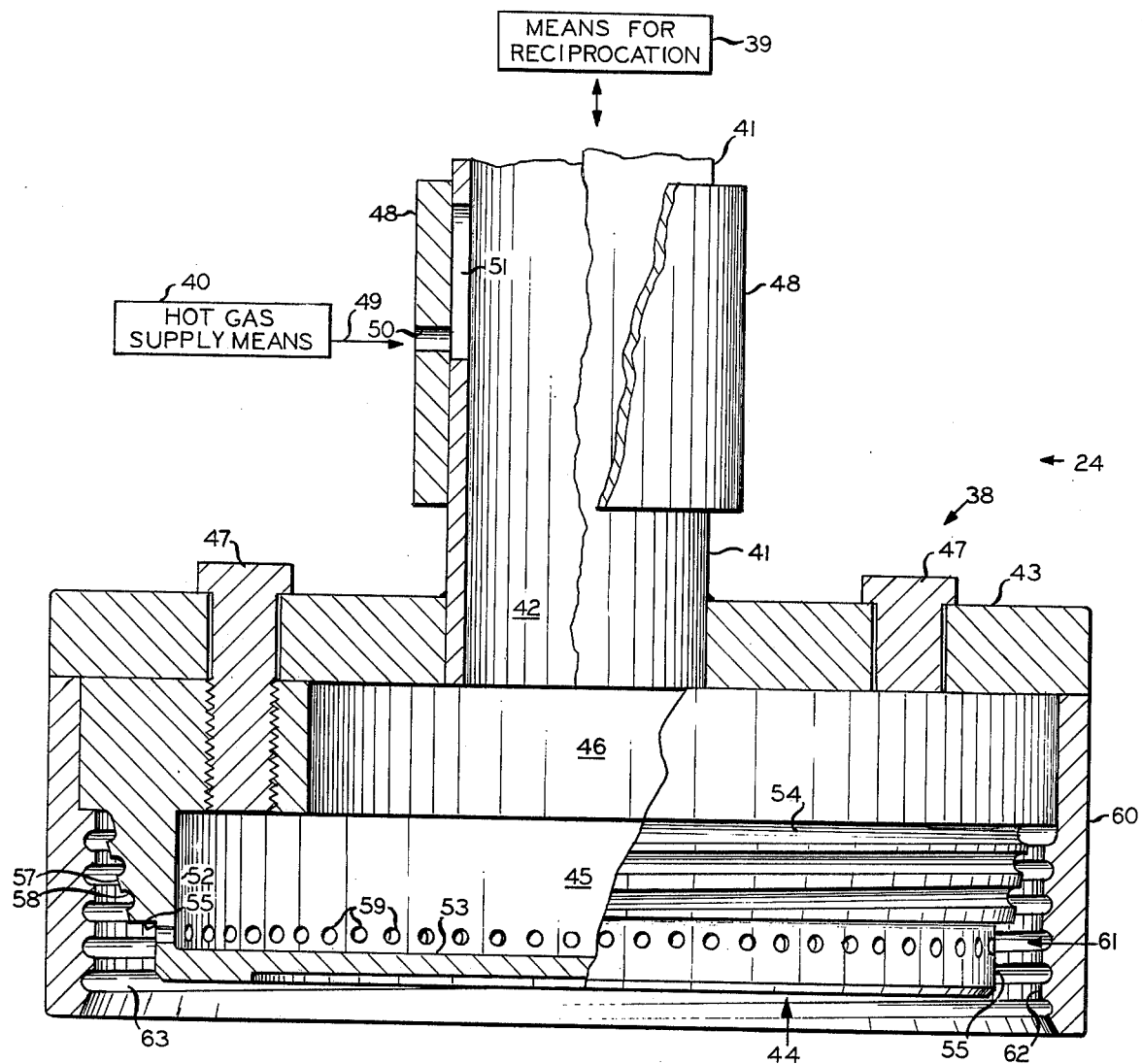
FIG. 2 is an elevational view, partly in cross section, of a bottom heating head in accordance with the present invention.
Figure 3:
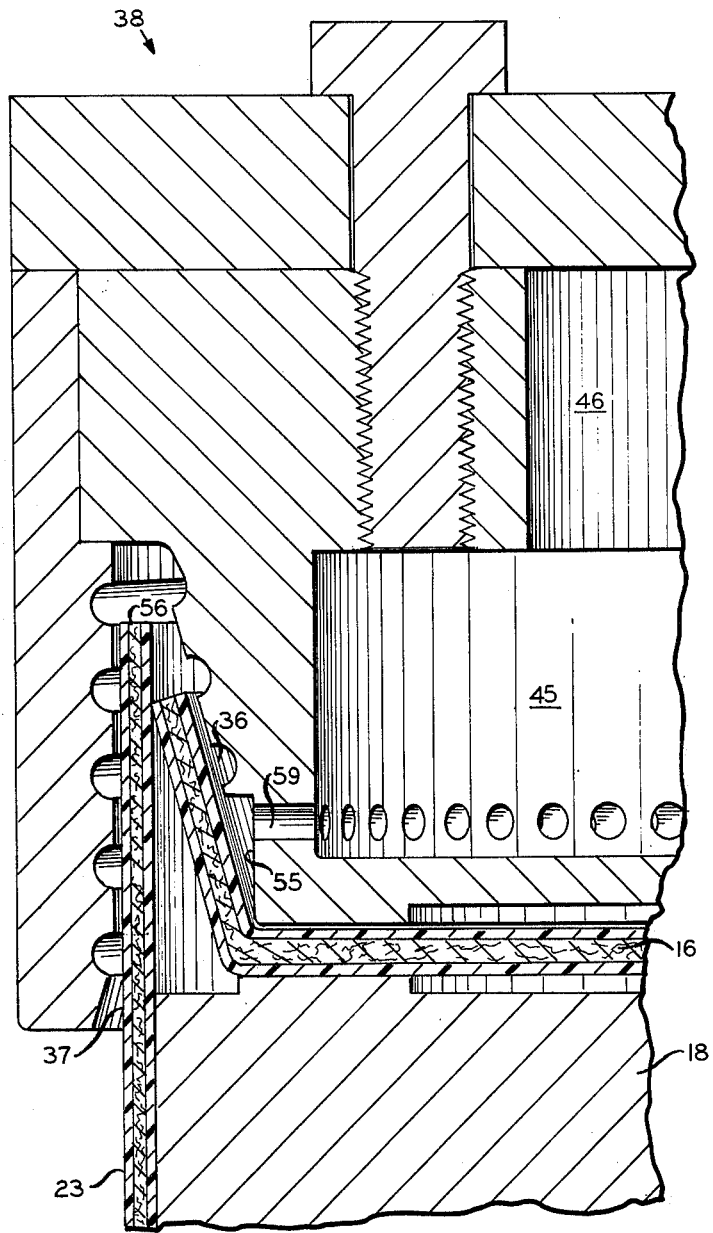
FIG. 3 is a fragmentary view in cross section of the bottom heating head of FIG. 2 in position to heat the end of a container.

Referring now to FIGS. 2 and 3, bottom heating means 24 is utilized to heat the annular skirt 36 of a flanged bottom member 16 and the adjacent bottom margin portion 37 of the tubular sidewall 23 in order to soften the thermoplastic coatings thereof to a suitable bonding temperature. The bottom heating means 24 comprises a bottom heating head 38, reciprocating means 39, and hot gas supply means 40. A conduit 41 having a passageway 42 therethrough is secured to base plate 43 by any suitable means, for example by welding. A central core block 44 having a planum chamber 45 and an opening 46 therein is secured to base plate 43 by any suitable means, for example bolts 47, with opening 46 providing fluid communication between passageway 42 and plenum chamber 45. Means for reciprocation 39, for example a cam actuated lever arm, is operatively connected to heating head 38 through conduit 41, to provide for reciprocation of heating head 38 back and forth along the longitudinal axis of conduit 41 from a retracted position to the carton heating position shown in FIG. 3. Conduit 41 extends through and moves relative to stationary yoke 48. A conduit means 49 provides for the passage of hot gas from supply means 40 through a passageway 50 in yoke 48 and a slot 51 in conduit 41 into passageway 42. The association of passageway 40 and slot 51 permits a continuous flow of hot gas into plenum chamber 45 during the reciprocation of heating head 38. Central core block 44 has an annular wall 52, the longitudinal central axis of which is coaxial with the mandrel 18 and tubular sidewall 23 in the bottom heating station, and a bottom wall 53 which is generally perpendicular to the axis of annular sidewall 52. The outer surface of wall 52 has annular recesses 54 and 55, each of which is circumferentially continous about the periphery of wall 52 in a plane at least substantially perpendicular to the longitudinal axis of wall 52. Recess 54 is located on wall 52 such that at least a portion thereof extends beyond the bottom edge 56 of tubular sidewall 23 when the bottom heating head 38 is in the heating position, as shown in FIG. 3. Recess 55 is located at the bottom portion of sidewall 52. The outer surface an annular wall 52 below annular recess 54 extends downwardly from recess 54 and inwardly toward the central longitudinal axis of wall 52 to recess 55 in a generally frustoconical configuraton 57. The frustoconical surface 57 is provided with at least one spirally inclined groove 58 which extends from recess 54 to recess 55. A plurality of jet passageways 59 are provided in wall 52 circumferentially spaced about the extent of recess 55 to provide fluid communication between plenum chamber 45 and recess 55 at a level adjacent to the open end of heater head 38 and remote from the level of the intended extent of entry of tubular member 23 into annular cavity 61. The jet passageways 59 are preferably spaced at equal distances about the extent of recess 55 in a plane at least substantially perpendicular to the central axis of central core block 44. In the illustrated embodiment, the passageways 59 extend radially outwardly from the central axis of core block 44, but each one can be inclined horizontally and/or vertically at an acute angle to the horizontal radial line from the central axis of core block 44 to the inner end of the respective passageway 59 to promote the spiral flow of the heating fluid upwardly between annular area 36 and frustoconical section 57.

An annular shroud 60 is secured to base plate 43 or core block 44 by suitable means, for example by bolts (not shown), such that shroud 60 is positioned circumjacently to central core 44 while forming an annular cavity 61 therebetween open at one end of heater head 38 to receive therein the end portion 37 of the tubular sidewall 23 to be heated. The cavity 61 has a radial width, with respect to the central axis of core block 44, which is greater than the corresponding wall thickness of tubular sidewall 23 and associated skirt portion 36 and a depth greater than the intended extent of entrys of sidewall 23 and skirt portion 36 into cavity 61. The cavity 61 diverges outwardly toward the open end of heater head 38. The inner wall 62 of shroud 60 has an at least generally cylindrical configuration with at least one spirally inclined groove 63 extending downwardly from the level of annular groove 54 to the lower portion of wall 62. A vertical slot can be formed in the portion of inner wall 62 adjacent the overlapped side margin of sidewall 23 to accommodate the increased thickness in the overlapped portion of the sidewall. The vertical slot can have a width slightly larger than the width of the overlapped portion of sidewal 23 and a depth sufficient to accommodate the double thickness, while permitting the flow of hot gas between the sidewall and the slot. If desired the at least one groove 63 can extend to the bottom edge of wall 62 or the bottom margin of wall 62 can be inclined outwardly and downwardly to avoid interference with bottom edge 56 in the event that the bottom margin 37 has any irregularities in configuration. The at least one groove 63 is preferably inclined in the direction opposite to the direction of inclination of the at least one groove 58 to provide increased uniformity of heating of annular skirt 36 and bottom margin 37. In the illustrated embodiment, the single groove 58 is a right-hand thread and the single groove 63 is a left-hand thread.

Reasonable variations and modifications are possible within the scope of the foreoing disclosure, the drawings and the appended claims to the invention. While the illustrated embodiment has a single spirally inclined groove 58 in frustoconical surface 57 and a single spirally inclined groove 63 in shroud 60, certain advantages of the invention can be achieved by employing the spiral groove or grooves in only one of the central core 44 and shroud 60. Although a plurality of grooves can be used in the central core 44 and/or the shroud 60, a single groove for each surface is presently preferred. Where a plurality of grooves are employed in either the central core block 44 of the shroud 60, they should have the same direction of inclination. The pitch of groove 58 and the pitch of groove 63 can be any value suitable to provide the desired increase in the length of the flow path of the hot gas in contact with the surfaces to be heated, but in general will be in the range of about 1 to about 50 threads per inch, preferably in the range of 2 to 30 threads per inch, and more preferably in the range of 4 to 20 threads per inch. The grooves 58 and 63 can be formed by cutting the grooves in central block 44 and shroud 60 or by the use of fins or flange attached to central block 44 and shroud 60. The invention has been illustrated in terms of a heater for the end of a tubular member having at least a substantially circular cross section perpendicular to the central axis thereof and a cylindrical shape, but it is also applicable to frustoconical tubular members and to tubular members having oval, rectangular, hexagonal, etc., cross sections. The term "annular" is employed in its broad meaning of the space between any two concentric similar configurations. While the invention has been illustrated with the heater head 38 being moved toward and away from the end of the tubular member, other means for effecting relative movement of the tubular member with respect to the heater head can be utilized. The end of the tubular member is placed in the annular groove 61 for a period of time sufficient for the hot gas flowing from passageway 59 to effect the desired heating and is then withdrawn from cavity 61 by the means effecting the relative motion of the tubular member and the heating head.

What is claimed is:

1. Apparatus for heating the end of a tubular member which comprises a heater head having a central core and a shroud, said shroud being positioned circumjacently to said central core and said shroud defining an annular cavity therebetween open at one end of said heater head to receive therein the end portion of said tubular member to be heated; said annular cavity having a width greater than the corresponding wall thickness of said tubular member and a depth greater than the intended extent of entry of said tubular member into said annular cavity, said central core having a plenum chamber therein, said central core having a plurality of passageways extending from said plenum chamber through the portion of said central core which forms a wall of said annular cavity at a level adjacent to said one end of said heater head and remote from the level of the intended extent of entry of said tubular member into said annular cavity, at least one of said portion of said central core which forms the inner wall of said annular cavity and the portion of said shroud which forms the outer wall of said annular cavity having at least one spirally inclined groove therein extending from adjacent said one end of said heater head to a depth in said annular cavity at least substantially as great as the intended extent of entry of said tubular member into said annular cavity; and means for introducing hot gas into said plenum chamber.

2. Apparatus in accordance with claim 1 wherein said portion of said central core which forms the inner wall of said annular cavity has at least one spirally inclined groove therein extending in a first direction of inclination from adjacent said one end of said heater head to a depth in said annular cavity at least substantially as great as the intended extent of entry of said tubular member into said annular cavity; and wherein said portion of said shroud which forms the outer wall of said annular cavity has at least one spirally inclined groove therein extending in a second direction of inclination from adjacent said one end of said heater head to a depth in said annular cavity at least substantially as great as the intended extent of entry of said tubular member into said annular cavity.

3. Apparatus in accordance with claim 2 wherein said portion of said central core which forms the inner wall of said annular cavity has an annular recess therein which is circumferentially continuous about the periphery of said inner wall at a depth in said annular cavity which is at least as great as the intended extent of entry of said tubular member, said at least one spirally inclined groove in said inner wall extending to said annular recess.

4. Apparatus in accordance with claim 3 wherein said first direction of inclination of said at least one spirally inclined groove in said inner wall is opposite to said second direction of inclination of said at least one spirally inclined groove in said outer wall.

5. Apparatus in accordance with claim 4 wherein the pitch of said at least one spirally inclined groove in said inner wall is in the range of about four to about 20 threads per inch; and wherein the pitch of said at least one spirally inclined groove in said outer wall is in the range of about four to about 20 threads per inch.

6. Apparatus in accordance with claim 5 wherein there is a single spirally inclined groove in said inner wall and a single spirally inclined groove in said outer wall.

7. Apparatus in accordance with claim 6 wherein said inner wall has an at least substantially circular cross section perpendicular to the central axis thereof, and wherein said outer wall has an at least substantially circular cross section perpendicular to the central axis thereof.

8. Apparatus in accordance with claim 7 wherein said inner wall is substantially frustoconical and said outer wall is substantially cylindrical so that said annular cavity diverges outwardly toward said one end of said heater head.

9. Apparatus in accordance with claim 8 wherein each of said plurality of passageways extends at least generally radially with respect to the central axis of said central core.

10. Apparatus in accordance with claim 1 wherein said portion of said central core which forms the inner wall of said annular cavity has an annular recess therein which is circumferentially continuous about the periphery of said inner wall at a depth in said annular cavity which is at least as great as the intended extent of said tubular member wherein said inner wall has at least one sprirally inclined groove therein extending from adjacent said one end of said heater head to said annular recess.

11. Apparatus in accordance with claim 1 wherein the pitch of said at least one spirally inclined groove is in the range of about two to about 30 threads per inch.

12. Apparatus in accordance with claim 1 wherein said inner wall has an at least substantially circular cross section perpendicular to the central axis thereof, and wherein said outer wall has an at least substantially circular cross section perpendicular to the central axis thereof.

13. Apparatus in accordance with claim 1 wherein said inner wall is substantially frustoconical and said outer wall is substantially cylindrical so that said annular cavity diverges outwardly toward said one end of said heater head.

14. Apparatus in accordance with claim 2 wherein said first direction of inclination of said at least one spirally inclined groove in said inner wall is opposite to said second direction of inclination of said at least one spirally inclined groove in said outer wall.

15. Apparatus in accordance with claim 14 wherein the pitch of said at least one spirally inclined groove in said inner wall is in the range of about four to about 20 threads per inch; and wherein the pitch of said at least one spirally inclined groove in said outer wall is in the range of about four to about 20 threads per inch.

16. Apparatus in accordance with claim 2 wherein there is a single spirally inclined groove in said inner wall and a single spirally inclined groove in said outer wall.

17. Apparatus in accordance with claim 2 wherein said inner wall has an at least substantially circular cross section perpendicular to the central axis thereof, and wherein said outer wall has an at least substantially circular cross section perpendicular to the central axis thereof.

18. Apparatus in accordance with claim 2 wherein said inner wall is substantially frustoconical and said outer wall is substantially cylindrical so that said annular cavity diverges outwardly toward said one end of said heater head.

19. Apparatus in accordance with claim 18 wherein each of said plurality of passageways extends at least generally radially with respect to the central axis of said central core.

20. Apparatus in accordance with claim 1 wherein each of said plurality of passageways extends at least generally radially with respect to the central axis of said central core.

21. Apparatus in accordance with claim 1 further comprising means for effecting relative movement of the heater head and the tubular member to place the end of the tubular member to be heated into said annular cavity for a time sufficient for the hot gas flowing from said passageways of said central core to heat said end of the tubular member to the desired degree and then to remove said end of said tubular member from said annular cavity.

22. A method of heating the end portion of a tubular member at one end thereof which comprises directing hot gas against the inside surface of said end portion, causing said hot gas to flow along said inside surface to said end and then to flow along the outside surface of said end portion, and causing at least one of the flow of said hot gas along said inside surface and the flow of said hot gas along said outside surface to follow a spiral path.

23. A method in accordance with claim 22 wherein the flow of said hot gas along said inside surface follows a spiral path and the flow of said hot gas along said outside surface follows a spiral path.

24. A method in accordance with claim 23 wherein said spiral paths are in opposite directions.

* * * * *

UNITED STATES PATENT AND TRADEMARK OFFICE
CERTIFICATE OF CORRECTION

PATENT NO. : 4,035,926
DATED : July 19, 1977
INVENTOR(S) : Silvio T. Farfaglia

It is certified that error appears in the above-identified patent and that said Letters Patent are hereby corrected as shown below:

Column 5, line 14, after "to said central core" insert --, said central core --. Column 6, line 1, delete "four" and insert -- 4 --; line 4, delete "four" and insert -- 4 --; line 36, delete "two" and insert -- 2 --; line 55, delete "four" and insert -- 4 --; line 58, delete "four" and insert -- 4 --.

Signed and Sealed this

Third Day of February 1981

[SEAL]

Attest:

RENE D. TEGTMEYER

Attesting Officer          Acting Commissioner of Patents and Trademarks